United States Patent [19]

Rouse et al.

[11] 4,374,573
[45] Feb. 22, 1983

[54] APPARATUS FOR SHREDDING RUBBER TIRES AND OTHER WASTE MATERIALS

[76] Inventors: Michael W. Rouse, 2412 Tipperary Ct., West Linn, Oreg. 97068; Robert L. Thelen, 509 N. 3rd, Woodburn, Oreg. 97071

[21] Appl. No.: 179,993

[22] Filed: Aug. 21, 1980

Related U.S. Application Data

[63] Continuation-in-part of Ser. No. 37,360, May 8, 1979, abandoned.

[51] Int. Cl.³ .................... B02C 18/18; B02C 18/22
[52] U.S. Cl. .................. 241/101.7; 241/167; 241/194; 241/234; 241/236; 241/DIG. 31
[58] Field of Search .................. 241/101.7, 159, 166, 241/167, 197, 230, 231, 234, 236, DIG. 31

[56] References Cited

U.S. PATENT DOCUMENTS

| | | | |
|---|---|---|---|
| 2,879,950 | 3/1959 | Pollitz | 241/234 |
| 3,656,697 | 4/1972 | Nelson | 241/236 X |
| 3,805,660 | 4/1974 | Burrough | 241/197 X |
| 3,931,935 | 1/1976 | Holman | 241/167 X |
| 4,134,556 | 1/1979 | Ehrlich et al. | 241/DIG. 31 |
| 4,156,508 | 5/1979 | Kisielewski | 241/DIG. 31 |
| 4,222,530 | 9/1980 | Whitney | 241/197 |
| 4,313,575 | 2/1982 | Stepanek | 241/197 X |

Primary Examiner—Howard N. Goldberg
Attorney, Agent, or Firm—Chernoff & Vilhauer

[57] ABSTRACT

Portable apparatus for shredding waste materials, particularly reinforced resilient materials such as used pneumatic tire casings, in which generally cylindrical cutter rolls, each comprising a plurality of cutter discs, are intermeshed with one another to shear scrap material into smaller pieces, and feeder-stripper rolls, each comprising a plurality of feeder-stripper discs, are intermeshed with the cutter rolls but spaced apart from one another. The cutter rolls are rotated in opposite directions, and each feeder-stripper roll is rotated in the same direction as the cutter roll with which it is intermeshed, thereby feeding scrap material between the two feeder-stripper rolls toward the cutter rolls. The feeder-stripper discs extend deeply between the cutter discs to eliminate clogging. The feeder-stripper rolls may be movable to provide greater separation for receiving and feeding larger pieces of scrap material into the casting mechanism. A conveyor is pivotable with respect to the shredding mechanism to carry shredded material to any of several positions relative to the apparatus.

18 Claims, 11 Drawing Figures

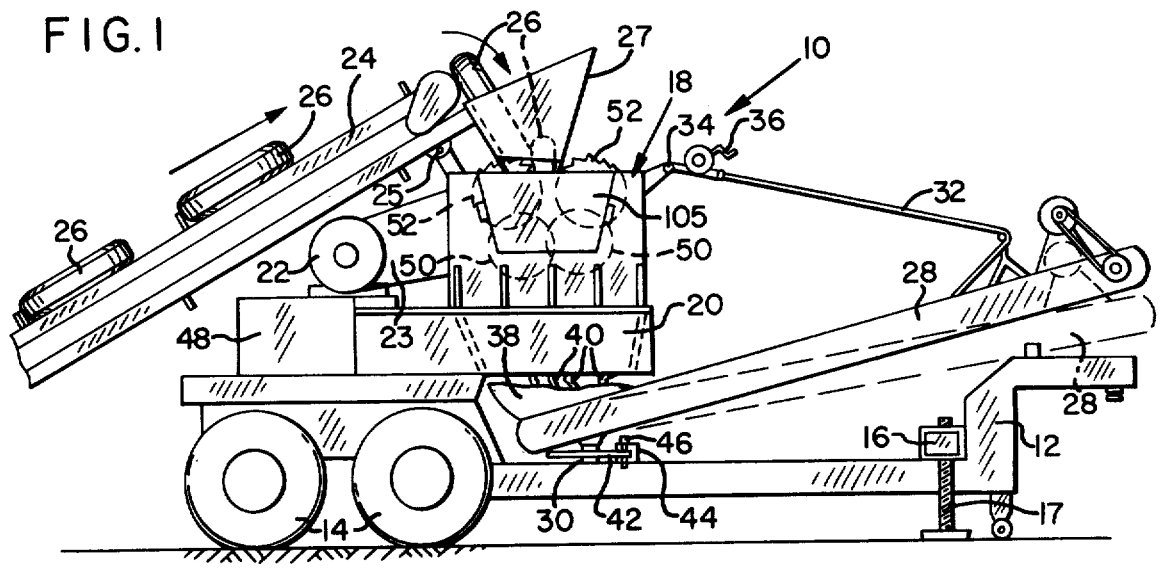
FIG.1
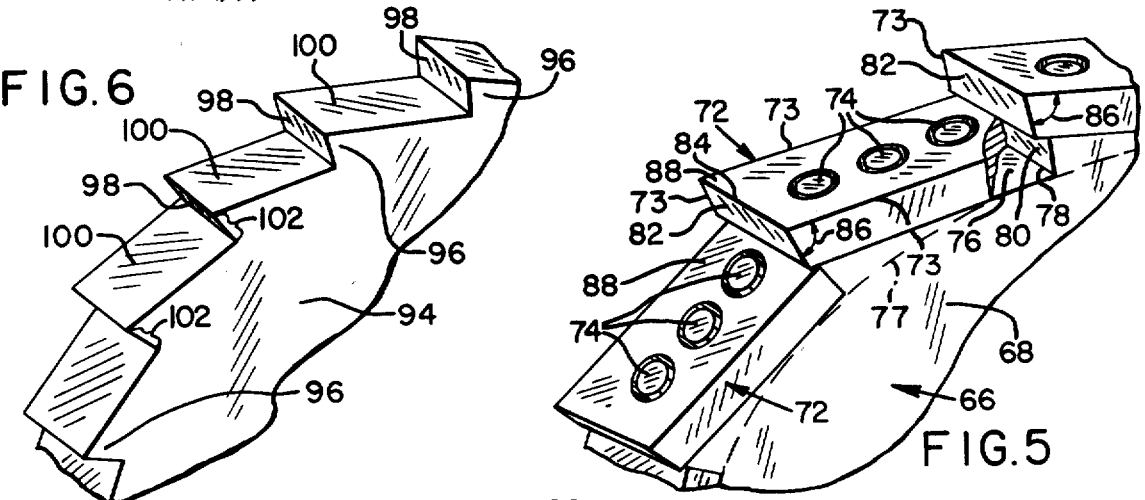
FIG.6
FIG.5
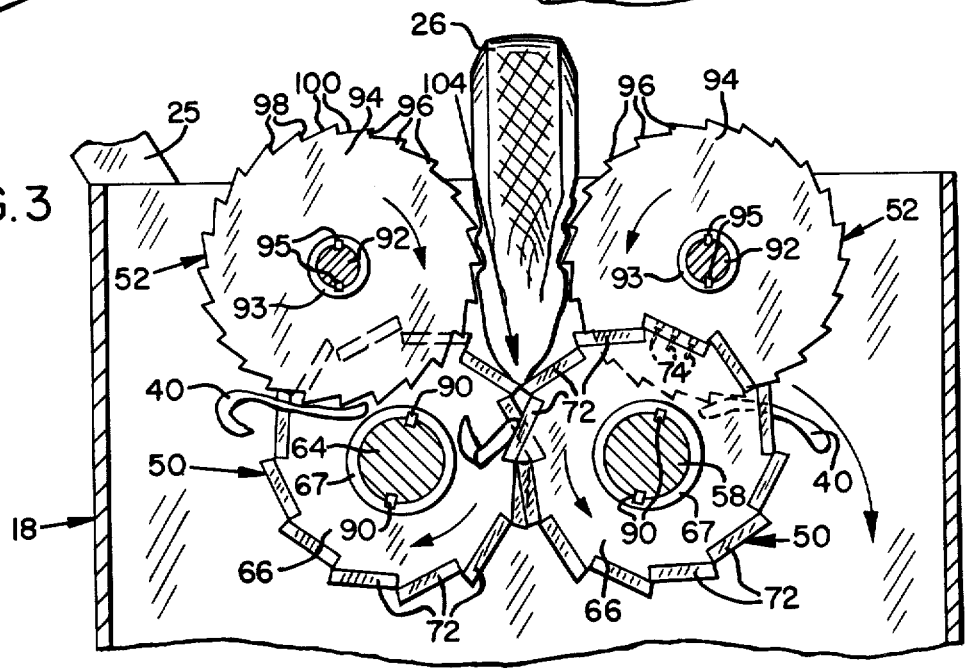
FIG.3

APPARATUS FOR SHREDDING RUBBER TIRES AND OTHER WASTE MATERIALS

REFERENCE TO RELATED APPLICATION

This application is a continuation-in-part of copending application Ser. No. 037,360, filed May 8, 1979, now abandoned.

BACKGROUND OF THE INVENTION

This invention relates to apparatus for cutting waste materials into smaller pieces, and particularly to apparatus suitable for shredding fiber-reinforced resilient material such as discarded rubber tires.

The disposal of waste materials has become a major problem in modern society as the cost of transportation has risen and the availability of land on which waste materials can safely be disposed has decreased. Many types of material are not readily adapted to disposal in sanitary land fill areas without being shredded into smaller pieces which take up less space. For example, pneumatic tire casings, particularly those reinforced with fiber or wire, are extremely durable, and when in their original form occupy a large volume compared to the actual volume of material of which they are made. Such scrap materials may also contain valuable reclaimable substances yet be uneconomical to transport for reclamation in original form because of their bulkiness and unwieldiness. Shredding such material, then, can increase the rate of decay of discarded material, make more surface area available for chemical reclamation processes, and reduce bulk sufficiently to greatly reduce transportation costs.

Until recently, worn out tires have typically been disposed of by accumulation in huge piles which are both unsightly and very long-lasting. These piles of tires also present fire and health hazards, since when burned such material produces toxic smoke and is very difficult to extinguish, and because water trapped in tires serves as an excellent breeding ground for mosquitoes and other undesirable insects.

As world-wide oil prices increase, recycling of scrap materials formerly wasted has become more economical. For instance, oil can be chemically recovered from used tire rubber. Chemical processes for recovering oil from old tires or for preparing old rubber for reuse, however, require that the surface area exposed to chemical action be increased over that presented by a tire in its ordinary form, and this can be accomplished by cutting tires into small pieces. Ground or shredded rubber products are also useful in the production of skid-resistant highway surfaces and resilient surfaces for running tracks and the like.

The resiliency of rubber, however, and its resistance to abrasion and cutting, especially when reinforced by fiber or wire, have previously made it very difficult to grind tires efficiently enough for the recycling of used tires to be economically worthwhile. Although some previously known devices were capable of shredding lighter weight tires such as some automobile tires, very large tires such as those used on large trucks, tractors and earth moving equipment, even though they contain large amounts of rubber, resisted economical shredding by previously known means. For example, hammermill grinders typically use too much energy in overcoming the resiliency of the rubber to shred or grind tires without a great amount of wasted heat, while slicers having reciprocating sharp-edged blades are typically too slow, and the knife edges of such equipment are susceptible to rapid wear and frequent breakage, and are difficult to sharpen, making such machines inefficient.

Devices such as the apparatus disclosed in Nelson U.S. Pat. No. 3,656,697, which abrasively reduce scrap such as tires to small pieces, additionally have many serious shortcomings which make them uneconomical to use. Abrasive coatings are quick to wear away, and in wearing away they contaminate the shredded material with bits of the abrasive material. This can be a serious problem when shredding rubber or plastics for future chemical reprocessing. Abrasive wheels are initially very expensive, and are also very expensive to maintain and repair. Abrasive reduction of tires as taught by Nelson produces large quantities of wasted heat, often igniting the rubber, with resulting heavy smoke. The abrasive grinding of tires is furthermore a slow process, since the Nelson apparatus merely gradually wears away the rubber surface, with a "V" shaped arrangement of a plurality of intermeshed parallel abrasive discs which retain scrap material within the "V" until it has been reduced to particles small enough to fall between the intermeshed discs.

Recently developed machinery, however, is capable of economically reducing tires and other scrap to smaller sized pieces. In particular, the tire grinding apparatus disclosed in Holman U.S. Pat. No. 3,931,935, Ehrlich et al. U.S. Pat. Nos. 4,052,013 and 4,134,556 and Baikoff U.S. Pat. No. 3,991,944 are all capable of shredding tires. All of these devices include a pair of counter-rotating cylindrical cutter rolls having intermeshing cutter discs which cooperatively shear or tear scrap material between sharp edges of adjacent discs.

A shortcoming common to prior art tire shredding apparatus is that large pieces of material may not initially be caught by the cutter discs of the cutter rolls of apparatus such as that disclosed by Holman, Baikoff, and Ehrlich et al. (in U.S. Pat. No. 4,052,013). Even though most of the above-mentioned apparatus for cutting scrap materials employs tapered feed chutes to position material to be shredded in an appropriate location above horizontally oriented cutter rolls, some materials, such as large tires, may bounce on the tops of the intermeshed cutter rolls for a considerable time before being caught and shredded by the cutter rolls. The lack of positive feed may thus allow scrap material to pile up atop the cutter rolls, rather than proceeding smoothly and continuously through the shredder, and efficiency is reduced, since no material is being shredded during such a blockage. To overcome this problem in prior art scrap shredders it is often necessary to manually position pieces of scrap material such as large tires for acceptance by the cutter rolls, a procedure which is at best labor-consuming, and additionally can be very dangerous.

Another problem of such apparatus as that of Holman is that cutter discs having replaceably attached peripheral cutting edge portions suffer wear of the side faces of the cutter discs radially inward from the replaceable cutting portions. Such worn areas tend to catch cut scrap material, increasing the power required to operate the apparatus and producing additional wasted heat. This occurs particularly when shredding rubber vehicle tires, because of the abrasive nature of tire rubber, steel tire tread belt and bead wire, and the gravel and sand often imbedded in or carried on the surfaces of discarded tires.

Ehrlich et al (556), discloses a plurality of sprocket-like infeed wheels which are located on parallel counter-rotating shafts to propel tires toward the converging portions of the cutter rolls of a tire-shredding machine. While these feeder wheels are helpful, they do not completely solve the problem, since a resilient tire casing can expand, between the feeder wheels and the cutter rolls, to a width preventing the cutter rolls from easily grasping the tire.

Furthermore, the infeed wheels disclosed by Ehrlich may be sufficient for feeding tires of a particular size range into a scrap cutting apparatus, but when the scrap to be shredded includes such articles as discarded steel drums, refrigerator cabinets and similar "white goods", as well as tires varying from three inches to 24 inches or more in tread width, it becomes readily apparent that an infeed mechanism of a fixed size may be very inefficient. What is needed, therefore, is a machanism for positively aligning and feeding scrap articles of widely varying sizes into a cutter mechanism.

Another common problem encountered in cutting apparatus utilizing an intermeshing pair of counter-rotating cutter rolls is that the material which has been cut tends to accumulate between adjacent discs of one or both of the cutter rolls. This problem was early recognized, and one way of dealing with the problem is illustrated in Milne U.S. Pat. No. 1,706,935, which discloses rotary strippers positioned on the discharge side of grass cutting apparatus which is similar in operation to the above-described scrap cutting apparatus of Holman, Ehrlich, and Baikoff. These strippers comprise radially-extending arms which pass between the cutter discs of each cutter roll to strip away cut material. Similarly, Asbill, Jr., U.S. Pat. No. 2,370,129 illustrates use of sawtooth-edged stripper wheels to remove cut material from between the cutter discs of a machine for cutting cotton, corn stalks, tobacco or other fibrous or sheet material, and Holman employs a similar pair of sawtooth-edged stripper wheels in one embodiment of his tire shredding apparatus. While the Holman, Asbill, and Milne machines are thus able to clear themselves, they do nothing to solve the first mentioned problem, that of ensuring that material is fed efficiently to the shredding apparatus itself.

Scrap shredding apparatus has in the past been portably mounted on trailer truck chassis for transport between sites where material to be shredded has been temporarily accumulated. Thus such apparatus may be brought to a local site and operated until the scrap accumulated at that location has been shredded, and the apparatus may then be moved to another site. Known portable shredding machines, however, typically allow shredded material to fall from the shredding apparatus to the ground, where it must later be picked up and loaded into a vehicle for further disposition. This, however, limits the positioning of such a portable scrap cutting apparatus, since access to the same position relative to the apparatus must always be provided so that cut scrap may be collected.

What is needed, therefore, is a portable scrap material cutting apparatus which advantageously orients and positively feeds scrap material such as large tires into the cutting mechanism so as to avoid pileup of scrap material at the point of entrance into the cutting mechanism, and which also strips cut material from the cutter rolls to prevent such already cut material from clogging and overloading the apparatus. It is also desirable to provide a mechanism which is wear resistant, efficient, and not likely to contaminate material being shredded. It would be particularly advantageous for such an apparatus to be portable and capable of conveying shredded scrap to any of various locations relative to the apparatus.

SUMMARY OF THE INVENTION

The aforementioned drawbacks and disadvantages of prior art portable scrap shredding machines, which render them subject either to pileups of scrap material at the infeed area of the cutting mechanism, or to clogging of the cutting mechanism by accumulation of cut scrap, or otherwise limit their efficiency or effectiveness, are overcome by the present invention, which provides a novel portable scrap shredding apparatus utilizing a single pair of rolls to both position and positively feed uncut scrap and to remove shredded scrap material from between cutter discs.

It is a major objective of the present invention, therefore, to provide a scrap shredding apparatus including positive feeding means which positions materials to be shredded and directs such material toward the receiving side of a pair of intermeshed cutting rolls of the shredding apparatus.

Another important objective of the present invention is to provide such scrap shredding apparatus which includes apparatus for forcibly stripping cut apart scrap material from between cutter discs of the cutting rolls, to prevent clogging of the cutting mechanism of the apparatus.

Yet another objective is to provide scrap shredding apparatus in which the orientation and positive feeding of scrap, and the clearing away of shredded scrap material, are simultaneously accomplished by the same portion of such an apparatus.

Yet a further objective of the present invention is to provide scrap shredding apparatus capable of positively feeding material of various sizes into the receiving side of a pair of intermeshed cutter rolls.

Still another objective of the present invention is to provide portable scrap shredding apparatus which enhances efficient shredding of scrap material by having the capability for loading shredded material into vehicles or containers at any of several locations with respect to the shredder, thus permitting the scrap shredding apparatus to be positioned advantageously with respect to the material to be shredded.

According to the present invention, a scrap shredding apparatus is provided which is capable of cutting reinforced resilient material such as tire casings, as well as other scrap such as refrigerator cabinets, sheet metal waste, wooden pallets, and the like. In the apparatus embodying the invention a pair of counter-rotating generally cylindrical cutter rolls, each having spaced apart discs mounted on a central longitudinal shaft, mesh with each other to provide a shearing action between edges of adjacent discs.

A pair of generally cylindrical feeder-stripper rolls, also comprising axially spaced apart discs mounted on a central shaft, orient and positively feed material to the cutter rolls and additionally prevent accumulation of shredded scrap between the discs of the cutter rolls. The feeder-stripper rolls are spaced apart from one another, but the discs of each feeder-stripper roll intermesh with the cutter discs of a respective one of the cutter rolls, with each feeder-stripper roll rotating in the same direction as the cutter roll with which it is intermeshed. In one embodiment of the invention the feeder-stripper rolls are adjustably spaced apart, urged resiliently toward one another to automatically accommodate pieces of scrap material of different sizes, while feeding them into the cutting mechanism.

The feeder-stripper rolls are located on the infeed side of the pair of cutter rolls, and are positively driven, to cooperatively direct the uncut scrap into the proper position with respect to the cutter rolls and positively feed scrap material toward the cutter rolls, yet each feeder-stripper roll is in a position to effectively push cut material outwardly from between the adjacent discs of the particular cutter roll with which it is intermeshed. In a preferred embodiment in which the shafts of the cutter rolls are oriented horizontally and the feeder-stripper rolls are located above the cutter rolls, the feeder-stripper discs strip cut scrap from between the discs of the cutter rolls, allowing it to fall downward beside the cutter rolls.

In a preferred embodiment of the invention the shredding apparatus is contained in a cutter box mounted on a truck trailer. One of the cutter rolls is driven by a chain driven through a reduction gear unit connected to an electric motor. A pair of intermeshing gears, one located on the shaft of each of the cutter rolls, drive the cutter rolls at equal speeds in opposite directions. A conveyor and a tapered hopper are provided to feed scrap to a position above the feeder-stripper rolls, which are movable to any of a plurality of positions to provide gripping engagement of scrap material of different sizes, depending on the amount of separation between the opposing rolls. The feeder-stripper rolls orient the scrap material and propel it forcibly toward the cutter rolls, which then cut the scrap material into smaller pieces. This arrangement permits the apparatus of the present invention to accept material to be shredded in a steady stream which is advantageously aligned and positively fed to the cutter rolls of the mechanism. Because of such positive feeding the cutting mechanism may be kept more evenly loaded, and can cut a greater amount of scrap in a given time.

In the preferred embodiment, a pivotably mounted off-load conveyor for carrying the cut scrap material away from the shredder extends from a position below the cutter rolls, and may be used to carry cut material to any of several discharge locations on either side of the trailer on which the grinder mechanism is mounted. Because of the pivotably mounted off-load conveyor, the apparatus of the invention may be positioned advantageously with respect to the scrap material to be shredded, and will still be capable of moving the shredded material from the shredder to a desired collection location.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side view of an exemplary portable scrap-shredding apparatus embodying the invention.

FIG. 3 is a sectional view of the feeder-stripper and cutter mechanisms of the scrap-shredding apparatus shown in FIG. 1, taken along line 3—3 of FIG. 2.

FIG. 5 is a fragmentary pictorial view of a portion of one of the cutter discs of the apparatus shown in FIG. 1.

FIG. 6 is a fragmentary pictorial view of a portion of one of the feeder-stripper discs of the apparatus shown in FIG. 1.

DETAILED DESCRIPTION OF THE INVENTION

Figure 2:
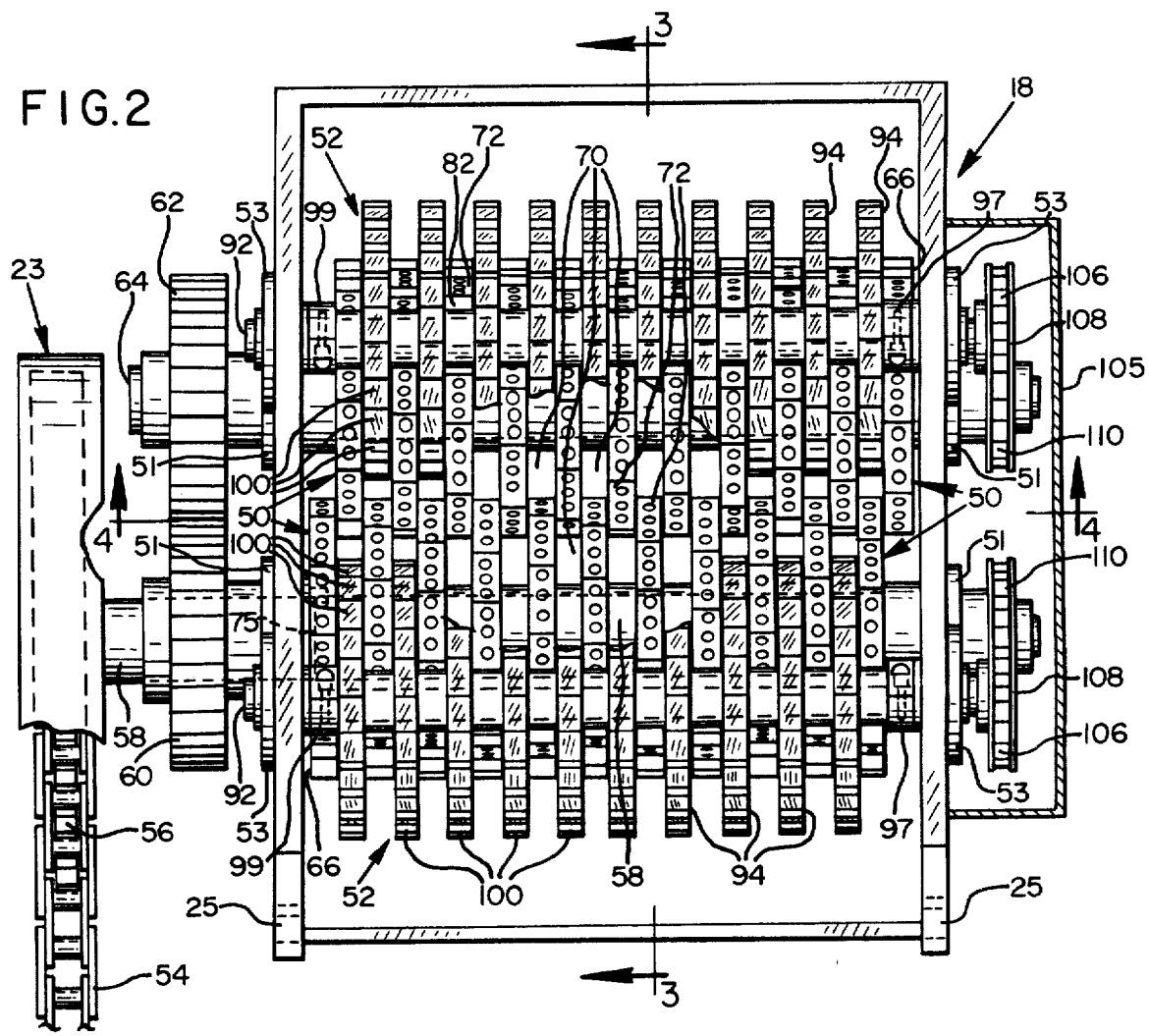
FIG. 2 is a top view of the feeder-stripper and cutter mechanisms of the scrap-shredding apparatus shown in FIG. 1, partially cut away to show hidden detail.

Referring now to FIG. 1 of the drawings, a portable scrap-shredding apparatus 10 is mounted for highway transport on carriage means such as a trailer bed 12 equipped with road wheels 14. Stabilizer beams 16 which include leveling jacks 17 are located at the front end of the trailer bed, and may be extended laterally to provide a solid stable platform to support the scrap shredding apparatus. A cutter box 18 which supports the cutter mechanism of the apparatus is supported by a frame 20 mounted on the trailer bed. A suitable drive mechanism is also mounted on the frame 20, and in a preferred embodiment of the invention comprises a 150-horsepower electric motor 22 connected to the cutter mechanism through speed-reduction gearing and a chain drive protected by a cover 23. An infeed conveyor 24 is attached to the cutter box 18 by a pivotal connection 25, and carries tires 26 and other scrap to be shredded to a position above the cutter box 18, allowing the scrap to fall downward into a chute 27 located above the cutter box 18. A motor-driven offload conveyor is mounted pivotally on the trailer bed 12 by means of a pivotal attachment point 30. The offload conveyor 28 is controllable by means of an upper support 32 which is pivotably attached at an upper attachment point 34 and the length of the upper support 32 is adjustable by means of a winch 36, to vary the inclination of the offload conveyor. A hopper 38 at the lower end of the offload conveyor 28 is located beneath the cutter box 18, where it catches the scrap shreds 40 which have passed through the cutter box 18. Suitable apparatus, for example a perforated plate 42 attached to the offload conveyor 28 for rotation therewith, a yoke 44 fixedly mounted on the trailer bed 12, and a removable pin 46 passing through the yoke and one of the perforations of the plate 42, is provided to secure the offload conveyor in a desired rotational position with respect to the trailer bed. Suitable electrical controls may be located within a control panel 48 to allow starting and stopping the individual conveyors and the electric motor 22.

Figure 4:
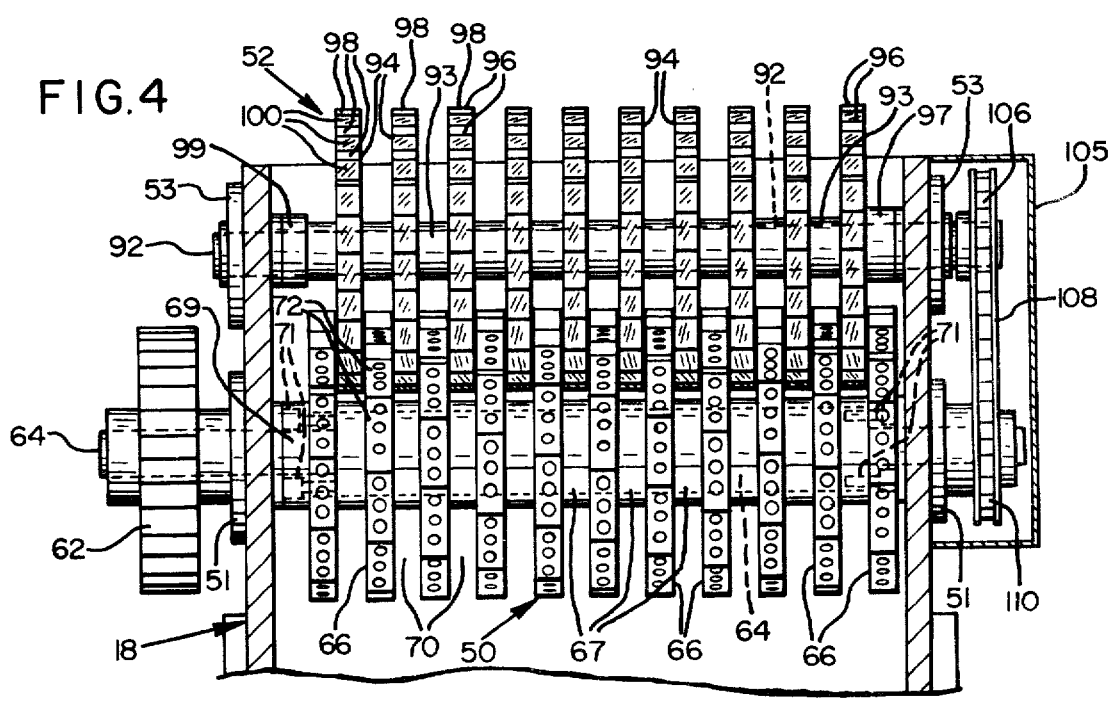
FIG. 4 is a sectional view of the feeder-stripper and cutter mechanism of the apparatus, taken along line 4—4 of FIG. 2.

Referring now to FIG. 2, the cutter box 18, shown in plan view, is seen to include a pair of intermeshed generally cylindrical cutter rolls 50 supported by bearings 51, and a pair of generally cylindrical feeder-stripper rolls 52, preferably of like diameter, supported by bearings 52. A drive chain 54 located within the cover 23 and driven by the motor 22 by means of a speed-reducing gearbox and a drive sprocket (not shown), drives a sprocket 56 fixedly mounted on a central shaft 58 of one of the cutter rolls 50. A spur gear 60 affixed to the shaft 58 is intermeshed with a similar spur gear 62 fixedly mounted on a central shaft 64 of the other of the pair of cutter rolls 50. The cutter rolls are thus driven counter-rotatingly at equal speeds. Referring now also to FIGS. 3–5, it may be seen that each cutter roll 50 is comprised of a plurality of similar cutter discs 66 which include sharp edges at the intersections of the peripheral surfaces of each cutter disc 66 with each generally flat side surface 68. The cutter discs 66 are axially spaced apart along the shafts 58 and 64 by cutter disc spacers 67 which are only slightly thicker than the thickness of each individual cutter disc 66, providing an axial clearance between cutter discs of each cutter roll of a few thousandths of an inch more than the thickness of each disc. Collars 69 attached to shafts 58 and 64 by screws 71 hold the cutter discs and spacers together, except at the end of shaft 58 adjacent to the drive sprocket 56, where a snap ring 75 holds the cutter discs and spacers in the correct location. The centers of the shafts 58 and 64 are spaced apart by a distance somewhat less than the diameter of each cutter disc 66. The cutter rolls 50 are thus intermeshed with one another, the cutter discs 66 of one roll extending a slight distance into the interstices 70 between adjacent cutter discs 66 of each cutter roll 50, with preferably 0.004 to 0.020 inch axial clearance between adjacent cutter discs to provide a shearing interaction to cut elastic, reinforced material such as vehicle tires as the cutter rolls 50 are rotated. The depth of intermeshing is preferably kept small to give improved leverage for shearing, ensuring that there is always some overlap between adjacent cutter segments of opposite cutter rolls.

Referring to FIG. 5, it may be seen that each cutter disc 66 includes cutter segments 72 which are bolted to the edge of each disc, allowing individual cutter segments to be easily removed from sharpening or replacement. The periphery of each cutter disc 66 is defined preferably by a plurality of planar surfaces 76, tangential to a base circle 77 shown in broken line, and a like number of planar surfaces 80 which extend radially from the points of tangency of the planar surfaces 76 forming cutter segment receiving corners 78. The cutter segments 72 are preferably manufactured of chrome alloy steel, in order to resist wear, and are machined to provide sharp cutting edges 73. The cutter segments 72 are individually fastened to the peripheral planar surfaces 76 by cutter segment securing bolts 74. The leading end 82 of each cutter segment 72 is preferably raked forward slightly in order to provide a better grip on scrap material as the cutter segment engages scrap to be cut. The cutter segment thus comprises a leading edge 84 having a preferred included angle 86 of approximately 75 degrees between the surfaces of the leading end 82 and the outer side 88 of each cutter segment. Although a smaller included angle might improve the ability to grip scrap material, it would provide additional stress against the segment securing bolts 74, and should therefore be avoided.

In a preferred embodiment of the invention each cutter disc 66 comprises a plurality of cutter segments 72 which are equally spaced about the periphery of each cutter disc. Each segment subtends an arc of slightly more than 30 degrees, thus completing the circle with 12 such edge segments 72, which overlap one another slightly and are equal to or slightly greater in width than the thickness of the cutter discs. The cutter discs 66 are fitted to the respective cutter roll shafts 58 and 64 so that the cutter segments 72 present a helically staggered arrangement. The positions of the discs are maintained by keys 90 fitted in associated keyways in each cutter disc 66, each cutter disc spacer 67, and each cutter roll shaft, with each cutter segment being rotationally offset 7½ degrees from the closest cutter segment on the adjacent cutter disc in each direction on that cutter roll. This helical arrangement of the cutter segments along the cutter rolls separates the impulses of the commencement of shearing action between cooperating pairs of cutter segments, thus reducing the levels of dynamic loading of the cutting rolls in comparison to a non-staggered alignment of the cutter discs.

Each feeder-stripper roll 52 includes a central shaft 92, and comprises a plurality of feeder-stripper discs 94, with feeder-stripper disc spacers 93 separating feeder-stripper discs along each feeder-stripper shaft 92. The feeder-stripper discs and spacers are prevented from rotating on the shaft by keys 95, and split collars 97 and split nuts 99 hold the feeder-stripper spacers 93 and discs 94 in proper axial position on the shafts 92, preferably centered in the interstices 70. Each of the feeder-stripper discs 94 is slightly thinner than each of the cutter discs 66, and has 24 sawtooth shaped teeth 96 in FIG. 3. In a preferred embodiment of the invention each said tooth 96 comprises a leading face 98 which extends along a radius of the feeder-stripper disc 94, and a sloped trailing face 100. In a preferred embodiment of the invention wherein the major diameter of a feeder-stripper disc 94 is 20½ inches, each leading face 98 has a radial depth 102 equal to 1 inch.

Referring again to FIGS. 3 and 4, it will be noted that the diameter of each of the cutter disc spacers 67 is slightly more than one-third of the diameter of each cutter disc 66 and that the diameter of each feeder-stripper disc spacer 93 is approximately one-fifth of the diameter of each feeder-stripper disc 94. The discs 94 of each feeder-stripper roll 52 are intermeshed with the discs 66 of one of the cutter rolls 50, with the circle traced by the tips of the teeth 96 separated slightly from the surface of the spacers 67 of the respective cutter roll, while a greater separation is provided between the leading edges 84 and the surfaces of the feeder-stripper disc spacers 93.

The feeder-stripper rolls 52, however, are not intermeshed with one another, their shafts 92 being separated far enough to allow whole tires and other scrap material being fed into the cutter box 18 to pass between the feeder-stripper rolls 52 toward an infeed side 104 of the intermeshed cutter rolls. In a preferred embodiment of the invention the diameter of each of the cutter discs 66 and feeder-stripper discs 94 is 20¼ inches, and the spacing between teeth 96 of opposite feeder-stripper rolls is 6 inches, thus allowing sufficient space for a large vehicle tire to pass between the feeder-stripper rolls by being compressed, and sufficient space for a small vehicle tire to pass between the feeder-stripper rolls with only slight compression. For smaller pieces of scrap material the feeder-stripper rolls maintain optimum orientation of the tire for acceptance by the cutter rolls, which grasp small tires more easily than wider tires, because a small tire can proceed easily to a position where there is a smaller angle between cutter roll surfaces contacted by a whole tire.

Because each individual feeder-stripper roll disc 94 is slightly thinner than each cutter roll disc 66, there is an appreciable spacing between adjacent surfaces of feeder-stripper discs and cutter discs. For example, a feeder-stripper disc 1¾ inches thick is satisfactory with cutter disc thickness of 2 inches. Because of this difference of thickness, although the feeder-stripper discs extend deeply into the interstices 70 between cutter discs, there is relatively little friction between feeder-stripper discs and adjacent cutter discs compared to the friction between adjacent intermeshed cutter discs as they shear scrap material.

Protected by a cover 105 fastened to the side of the cutter box 18, a sprocket 106 is fixedly attached to one end of each feeder-stripper roll shaft 92, and an endless drive, such as a chain 108, connects each sprocket 106 to a sprocket 110, of which one is located on each of the shafts 58 and 64 of the cutter rolls 50. Each feeder-stripper roll 52 is thereby driven in the same direction as the associated cutter roll 50. The sprockets 106 and 110 are of like size, so that the feeder-stripper rolls 52 rotate at the same speed as the cutter rolls 50, and since the cutter rolls and feeder-stripper rolls 52 are of equal diameter, the surface speed of the feeder-stripper rolls 52 equals that of the cutter rolls 50. This assures that scrap material is fed to the cutter rolls at a speed which neither clogs nor exerts a drag on the action of the cutter rolls.

Figure 7:
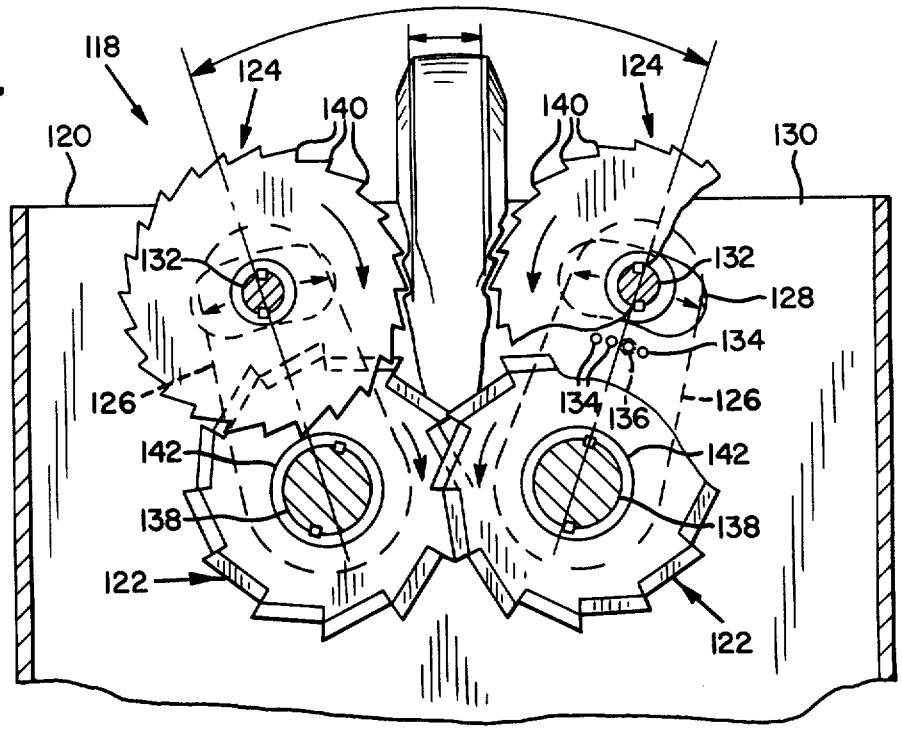
FIG. 7 is a sectional, partially cut away view of another embodiment of the scrap-shredding apparatus of the invention.
Figure 8:
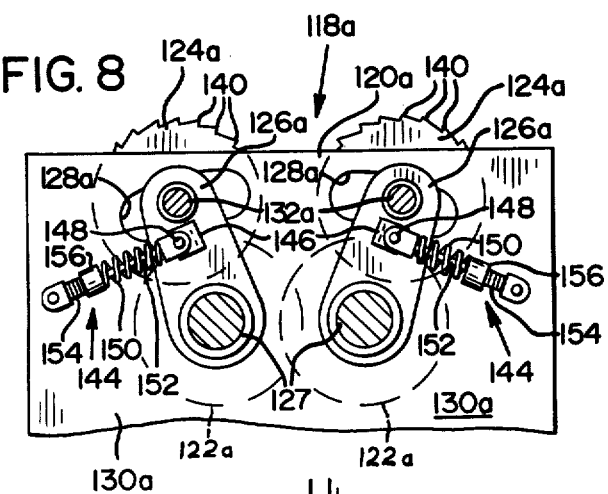
FIGS. 8 and 9 are simplified elevational views of portions of yet other embodiments of the present invention.
Figure 9:
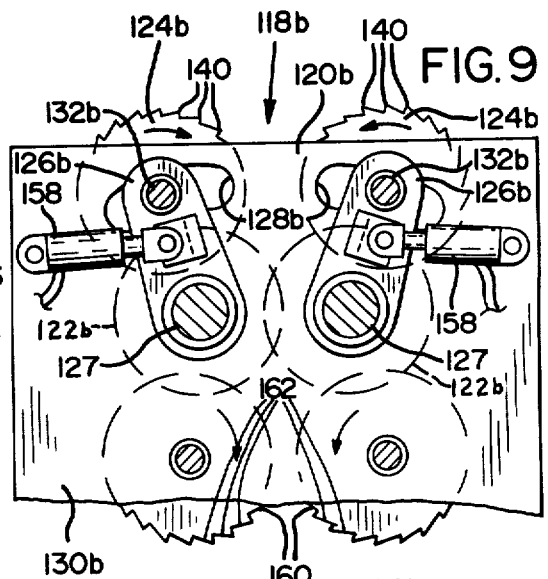

Referring now also to FIGS. 7-9, alternative embodiments of the invention, in which the feeder-stripper rolls are movable to accommodate pieces of scrap material of widely varying sizes are shown.

Referring particularly to FIG. 7, a scrap-shredding mechanism 118 comprises a cutter box 120 and a pair of cutter rolls 122, similar to the cutter rolls 50 of the previously described embodient of the invention. A pair of feeder-stripper rolls 124 are also similar to the feeder-stripper rolls 52 of the previously described embodiment of the invention. The feeder-stripper rolls 124 are each intermeshed with a respective one of the cutter rolls 122, and a drive mechanism (not shown), equivalent to the sprockets 106, chains 108, and sprockets 110 of the above-described embodiment of the invention, is provided to drive each feeder-stripper roll 124 in the same direction of rotation as the respective cutter roll 122 with which it is associated and intermeshed. The cutter rolls 122 are intermeshed with one another as are the cutter rolls 50 of the previously described embodiment of the invention, while the feeder-stripper rolls 124 are spaced apart from one another. In the present embodiment of the invention, the feeder-stripper rolls 124 are supported by movable support arms 126 which allow adjustment of the separation between the feeder-stripper rolls 124 to accommodate scrap material of different sizes. One end of each of the support arms 126 is preferably mounted on suitable bearings such as the bearings 127 (FIGS. 8 and 9) for rotation through a limited angle about the shaft 138 of the respective cutter roll 122 with which the associated feeder-stripper roll 124 is associated. To accommodate this movement of the feeder-stripper rolls 124 toward and away from each other an opening 128 is provided where the shafts 132 of the feeder-stripper rolls 124 pass through the end wall 130 of the cutter box 120.

To retain the feeder-stripper rolls in a given position, various means may be used, for example, a plurality of spaced-apart holes 134 may be provided to receive a fastener such as a bolt 136, to secure each of the support arms 126 in a selected position determining the separation between the two feeder-stripper rolls 124.

Rotatability of the support arms 126 about the shaft 138 of the respective cutter roll 122 ensures that the drive mechanism for the feeder-stripper rolls need not be adjusted when the position of the feeder-stripper rolls relative to one another is adjusted, and additionally maintains the same spacing between the teeth 140 of each feeder-stripper roll and the respective spacer 142.

In FIG. 8, a slightly different embodiment of the invention is shown, in which the support arms 126a are adjustably positioned by means of spring loaded pusher bars 144 pivotably connected with each of the support arms 126a, for example by an ear 146 and a pin 148. A helical spring 150 surrounds a bar 152 which is telescopically movable within a support tube 154 which is pivotably connected to the end wall 130a. An adjustable collar 156 is supported on the tube 154, for example by means of threads, permitting adjustment of the compression of the spring 150, allowing the support arms 126a to rotate away from one another to increase the separation between the feeder-stripper rolls 124a in response to receiving large pieces of scrap material.

Referring now to FIG. 9, another variation of the invention may be seen, in which a hydraulic cylinder and piston assembly 158 is connected pivotably to each of the support arms 126b to controllably position the support arms 126b with respect to one another to accommodate different sized pieces of scrap material for feeding into the cutting mechanism of the apparatus 120b. It will be readily apparent that the hydraulic cylinder and piston assemblies 158 may be extended by means of fluid connected to a constant pressure accumulator, permitting floating movement of the feeder-stripper rolls 124b relative to one another in response to the size of the pieces of scrap material fed therebetween. Additionally, the hydraulic cylinder and piston assemblies 158 may be extended or retracted as required, under manual control, to accommodate the predominant size of articles of scrap material being shredded.

Also shown in FIG. 9 are a pair of lower stripper rolls 160 which are intermeshed with the respective cutter rolls and spaced apart a fixed distance from one another. Each lower stripper roll 160 includes peripheral teeth 162 and is rotated in the same direction as the respective cutter roll 122b with which it is intermeshed, in order to remove at least a portion of the shredded scrap material from between the neighboring cutter discs on the respective cutter roll 122b with which each of the stripper rolls 166 is intermeshed. This provision of stripper rolls below the cutter rolls may at times be desirable in order to force cut apart scrap material from between cutter discs toward a single location centrally located below the intermeshed portions of the cutter rolls 122b.

In operation of the apparatus, scrap material such as vehicle tires 26, (FIG. 1) is fed into the chute 27 by means of the infeed conveyor 24. As each tire 26 drops into the chute 27 the teeth 96 of the feeder-stripper rolls 52, (aligned with one another parallel to the length of each feeder-stripper roll 52) move the tire toward a vertical orientation, causing the tire to proceed downward between the feeder-stripper rolls 52 which, in the case of a large vehicle tire, compress the tire and urge it toward the intermeshing portions of the cutter rolls 50.

Because the feeder-stripper rolls are intermeshed with the cutter rolls, tires remain compressed as they proceed to a point on the infeed side 104 of the cutter rolls 50, deep between the converging edges of the cutter discs 66. The leading edge 84 of each cutter segment 72 engages each tire 26, allowing the cutting edges 73 of adjacent cutter segments to shear it into smaller pieces. The feeder-stripper rolls 52 thus place large pieces of scrap material, which could otherwise bounce about on the infeed side 104 of the intermeshing portions of the cutter rolls 50 without being grasped by the cutter rolls, into the most advantageous orientation to allow them to be cut by the cutter rolls.

Tough, resilient material such as reinforced rubber tire material would ordinarily tend to elastically expand after being cut, and would remain between the adjacent cutter discs 66 of one or the other of the cutter rolls 50, thus being carried back toward the infeed side 104 of the intermeshing portions of the cutter rolls 50. The sawtooth shaped teeth 96 of the feeder-stripper rolls 52, however, extend into the interstices 70 between the cutter discs 66 to a depth nearly reaching the cutter disc spacers 67, and the feeder-stripper rolls 52 then strip shredded material from between the cutter roll discs 66 to prevent it from clogging the cutter rolls. As soon as the material has been cut, the feeder-stripper rolls 52 then strip shredded material from between the cutter roll discs 66 to prevent it from clogging the cutter rolls. As soon as the material has been cut, the feeder-stripper rolls clear it from between adjacent cutter discs, moving the scrap shreds 40 to a position allowing them to drop clear of the cutter rolls 50 and to proceed downward into the loading hopper 38 of the offload conveyor 28.

The apparatus embodying the invention is capable of being moved from one scrap deposition location to another with the offload conveyor 28 centralized and lowered into a stowage or transport position as indicated in broken line in FIG. 1. The portable tire grinder 10 may be located conveniently near to a pile of scrap material, and the stabilizer beams 16 and jacks 17 may be extended and adjusted to provide a stable platform for the portable tire grinder 10. The off-load conveyor 28 may be pivoted about the pivotal connections 30 and 34 and secured by the plate 42, yoke 44, and pin 46, while the conveyor may be adjusted in height by means of the crank and winch mechanism 36 to conveniently load shredded scrap into waiting trucks or hoppers for transport to a permanent landfill site or processing site for recovery of the resources contained in the scrap material.

The offload conveyor 28 could also be used to deposit cut scrap material into a size screening mechanism whereby material of a predetermined size could be deposited from the screening apparatus into a truck or other box, while pieces which were still larger than the desired size could be returned by a conveyor (not shown) into the chute 27 for reshredding into yet smaller pieces. The feeder-stripper rolls 52 tend to orient elongate pieces which have already been once processed through the scrap shredder across the infeed side 104 of the cutter rolls 50 such that the second cutting shears the elongate shaped pieces generally perpendicularly to their length, into several short pieces.

Similarly, the scrap-shredding mechanisms 118, 118a, and 118b of FIGS. 7-9 may be mounted on a chassis (not shown) for portable use. Operation of the scrap shredding mechanisms 118-118b is similar to that of the previously described embodiment of the shredding mechanism, except that the spacing between the feeder-stripper rolls 124, 124a, 124b, respectively, is variable to accommodate scrap material of different sizes to efficiently and forcefully feed the scrap material into the infeed side of the intermeshed cutter rolls 122, 122a, 122b as will be readily apparent from the preceding discussion.

Figure 10:
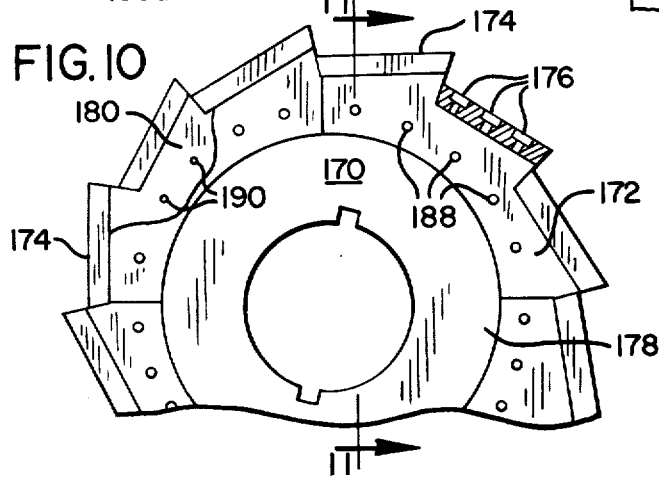
FIG. 10 is a side view of an improved cutter disc for use in the apparatus of the invention.
Figure 11:
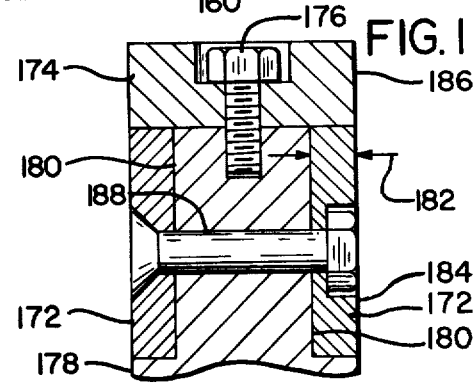
FIG. 11 is a sectional view of the cutter disc of FIG. 10, taken along the line 11—11.

Referring now to FIGS. 10 and 11, an improved cutter disc 170 for use in the cutter rolls of the apparatus is generally generally similar to the cutter discs 66, shown in FIGS. 2-5, but also includes abrasion resistant replaceable wear plates 172 on each side thereof. The cutter disc 170 is equipped with cutter segments 174 which are similar to the cutter segments 72 and are fastened to the disc by, for example, bolts 176, equivalent to the bolts 74 of the cutter discs 66.

The cutter disc 170 has generally planar surfaces 178, with the radially outer areas of each side of the disc 170 being recessed to a depth of, for example, one-fourth inch, to provide a recessed surface 180 on each side of the disc 170, against which the wear plates 172 fit closely. The wear plates 172 have a thickness 182 equal to the depth to which the surface 180 is recessed, so that the outer surface 184 of the wear plate 172 is a coplanar extension of the respective surface 178 of the cutter disc 170, and additionally is aligned with the side surfaces 186 of the cutter segments 174. The wear plates 172 are preferably shaped to extend along the recessed surfaces 180 and abut against the cutter segments 174. The wear plates 172 extend radially inward to protect the cutter disc 170 to a distance which depends on such factors as the type of scrap material being shredded and the distance by which the cutter rolls of the apparatus are intermeshed.

The wear plates 172 may be attached to the cutter disc 170 by through bolts 188, which extend through holes 190 in the cutter disc 170 with the heads and nuts of the bolts 188 being countersunk in the wear plates 172. Each wear plate 172 protects, for example, a ninety-degree segment of the disc 170, making it convenient to replace the wear plates 172 on the cutter discs 170 without disassembly of the cutter roll of which each cutter disc 170 is a part.

While the particular material of the wear plates 172 is a matter of design choice, it is to be understood that they are to be of hard durable metal which is resistant to abrasive materials such as steel tire cord and beadwire, and sand and gravel imbedded in tires and other scrap. As a result, scrap shredding apparatus including such wear plates 172 will be capable of long operation without increased power requirements because of scrap material caught in worn-away areas of cutter disc side surfaces.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for comminuting scrap material, including reinforced resilient materials such as vehicle tires, comprising:
    (a) cutting means including an intermeshed pair of rotatably mounted generally cylindrical cutter rolls, said intermeshed cutter rolls having an infeed side, each of said cutter rolls including a plurality of axially spaced apart cutter discs, said cutter discs having opposed side surfaces and having planar peripheral surfaces which meet said side surfaces defining cutting edges at the intersections therebetween, said cutter rolls being intermeshed with one another so that a plurality of said cutter discs of each of said cutter rolls extend into the interstices between the cutter discs of the other said cutter rolls, with a side of each of said cutter discs of one of said cutter rolls overlapping and being closely adjacent to a side of one of said cutter discs of the other of said cutter rolls, for cooperatively forcing respective portions of said scrap material into the interstices between neighboring ones of the cutter discs of the opposite one of said cutter rolls, thereby shearing said scrap material into pieces having respective dimensions corresponding to the spacing between neighboring ones of the cutter discs on one of said cutter rolls;

(b) feeder-stripper means located on said infeed side of said cutter rolls, for forcing said scrap material into a position on said infeed side where said cutter rolls can engage said scrap material, and for thereafter stripping said pieces of said scrap material from said interstices between said cutter discs, said feeder-stripper means comprising a pair of generally cylindrical feeder-stripper rolls, each of said feeder-stripper rolls including a plurality of feeder-stripper discs, said feeder-stripper rolls being radially spaced apart from one another, defining a space through which to feed said scrap material toward said intermeshed cutter rolls, and each of said feeder-stripper rolls being intermeshed with a respective one of said cutter rolls, with a respective one of said feeder-stripper discs extending radially into each of said interstices between the cutter discs of each cutter roll to a depth sufficient for forcing substantially all said pieces of scrap material from said interstices; and (c) drive means for counterrotating said intermeshed cutter rolls about their respective axes so that the peripheral surfaces of respective cutter discs of said cutter roll move toward one another on said infeed side, and for rotating each of said feeder-stripper rolls in the same direction as the respective one of said cutter rolls with which it is intermeshed.

2. The apparatus of claim 1 wherein said feeder-stripper rolls are located above said cutter rolls and feed said scrap downwardly into said cutting means.

3. The apparatus of claim 1 wherein the edges of said feeder-stripper discs include radially extending sawtooth shaped teeth having generally radially extending leading surfaces for engaging said scrap material.

4. The apparatus of claim 1 further including carriage means for movement and including pivotably mounted offload conveyor means for conveying shredded scrap away from said cutting means to any of several different locations with respect to said carriage means.

5. The apparatus of claim 4 wherein said carriage means comprises an elongate support structure, said cutting means being located near one end of said support structure and said offload conveyor means being pivotable to a transport position generally parallel with a longitudinal axis of said support structure.

6. The apparatus of claim 1 including means for rotating said feeder-stripper rolls such that the surface speed of said feeder-stripper rolls equals the surface speed of said cutter rolls.

7. The apparatus of claim 1 wherein said cutter discs comprise a plurality of replaceable cutter segments, each said cutter segment having a leading end, each said leading end having a leading edge, said leading end of each of said cutter segments overlapping the longitudinally adjacent one of said cutter segments on one of said cutter discs, and said leading edge including an acute angle.

8. The apparatus of claim 7, wherein each of said plurality of feeder-stripper discs has a thickness which is less than the thickness of each of said plurality of cutter discs, said apparatus further comprising means including a plurality of feeder-stripper disc spacers separating said feeder-stripper discs of each said feeder-stripper roll, for locating each of said plurality of feeder-stripper discs in an axially central location within one of said interstices.

9. The apparatus of claim 1 wherein the axial separation between adjacent ones of said cutter segments of such pair of intermeshed cutter rolls is not more than about 0.020 inch.

10. The apparatus of claim 1 wherein said cutter discs comprise a plurality of replaceable cutter segments including said planar peripheral surfaces, and replaceable abrasion resistant wear plate means located on opposite sides of said cutter discs inwardly adjacent to said cutter segments, for resisting abrasion by said scrap material during operation of said apparatus.

11. The apparatus of claim 10 wherein said wear plate means comprises a plurality of wear plates, said cutter discs having recessed portions and said wear plates being attached thereto, said wear plates defining a part of each of said opposed side surfaces.

12. Apparatus for comminuting scrap material, including reinforced resilient material such as vehicle tires, comprising:

(a) cutting means including an intermeshed pair of rotatably mounted generally cylindrical cutter rolls, said intermeshed cutter rolls having an infeed side, each of said cutter rolls including a plurality of axially spaced-apart cutter discs, said cutter discs having opposed side surfaces and having planar peripheral surfaces which meet said side surfaces defining cutting edges at the intersection therebetween, said cutter rolls being intermeshed with one another so that a plurality of said cutter discs of each of said cutter rolls extend into the interstices between the cutter discs of the other of said cutter rolls, with a side of each of said cutter discs of one of said cutter rolls overlapping and being closely adjacent to a side of one of said cutter discs of the other of said cutter rolls, for cooperatively forcing respective portions of said scrap material into the interstices between neighboring ones of the cutter discs of the opposite one of said cutter rolls, thereby shearing said scrap material into pieces having respective dimensions corresponding to the spacing between neighboring ones of the cutter discs on one of said cutter rolls;

(b) feeder-stripper means located on said infeed side of said cutter rolls, for forcing said scrap material into a position on said infeed side where said cutter rolls can engage said scrap material, and for thereafter stripping said pieces of said scrap material from said interstices between said cutter discs, said feeder-stripper means comprising a pair of generally cylindrical feeder-stripper rolls, each of said feeder-stripper rolls including a plurality of feeder-stripper discs, said feeder-stripper rolls being radially spaced apart from one another, defining a space through which to feed said scrap material toward said intermeshed cutter rolls, and each of said feeder-stripper rolls being intermeshed with a respective one of said cutter rolls, with a respective one of said feeder-stripper discs extending radially into each of said interstices between the cutter discs of each cutter roll to a depth sufficient for forcing substantially all said pieces of scrap material from said interstices;

(c) drive means for counterrotating said intermeshed cutter rolls about their respective axes so that the peripheral surfaces of respective cutter discs of said cutter rolls move toward one another on said infeed side, and for rotating each of said feeder-stripper rolls in the same direction as the respective one of said cutter rolls with which it is intermeshed; and (d) movable support arm means for supporting said feeder-stripper rolls and permitting adjustment of the separation between said opposing feeder-stripper rolls, while keeping constant the radial depth to which each feeder-stripper roll is intermeshed with the respective cutter roll.

13. The apparatus of either of claims 1 or 12, including a cutter disc spacer located between neighboring cutter discs of each cutter roll, wherein the radial clearance between the periphery of said feeder-stripper discs and a respective cutter roll spacer being less than the radial distance to which said cutter rolls are intermeshed with one another.

14. The apparatus of claim 12, including a cutter box supporting and surrounding said cutter means and a plurality of positioning apertures located on said cutter box, and corresponding fastener means for extending into said positioning apertures from said support arm means, for securing said feeder-stripper rolls in respective selected positions.

15. The apparatus of claim 12, including feeder-stripper roll positioning means comprising a controllably extensible fluid operated cylinder and piston assembly means operatively interconnected with said movable support arm means, for selectively moving said feeder-stripper rolls toward and away from one another.

16. The apparatus of claim 12, including resilient means for urging said feeder-stripper rolls toward a selected position and permitting said feeder-stripper rolls to move apart from one another in response to feeding a large piece of scrap material therebetween.

17. The apparatus of claim 16 wherein said resilient means comprises a spring extending between said frame and said support means, and means for adjustably compressing said spring and urging said feeder-stripper rolls toward one another.

18. Apparatus for comminuting scrap material, including reinforced resilient material such as vehicle tires, comprising:

(a) cutting means including an intermeshed pair of rotatably mounted generally cylindrical cutter rolls, said intermeshed cutter rolls having an infeed side, each of said cutter rolls including a plurality of axially spaced-apart cutter discs, said cutter discs having opposed side surfaces and having planar peripheral surfaces which meet said side surfaces defining cutting edges at the intersection therebetween, said cutter rolls being intermeshed with one another so that a plurality of said cutter discs of each of said cutter rolls extend into the interstices between the cutter discs of the other of said cutter rolls, with a side of each of said cutter discs of one of said cutter rolls overlapping and being closely adjacent to a side of one of said cutter discs of the other of said cutter rolls, for cooperatively forcing respective portions of said scrap material into the interstices between neighboring ones of the cutter discs of the opposite one of said cutter rolls, thereby shearing said scrap material into pieces having respective dimensions corresponding to the spacing between neighboring ones of the cutter discs on one of said cutter rolls;

(b) feeder-stripper means located on said infeed side of said cutter rolls, for forcing said scrap material into a position on said infeed side where said cutter rolls can engage said scrap material, and for thereafter stripping said pieces of said scrap material from said interstices between said cutter discs, said feeder-stripper means comprising a pair of generally cylindrical feeder-stripper rolls, each of said feeder-stripper rolls including a plurality of feeder-stripper discs, said feeder-stripper rolls being radially spaced apart from one another, defining a space through which to feed said scrap material toward said intermeshed cutter rolls, and each of said feeder-stripper rolls being intermeshed with a respective one of said cutter rolls, with a respective one of said feeder-stripper discs extending radially into each of said interstices between the cutter discs of each cutter roll to a depth sufficient for forcing substantially all said pieces of scrap material from said interstices;

(c) drive means for counterrotating said intermeshed cutter rolls about their respective axes so that the peripheral surfaces of respective cutter discs of said cutter rolls move toward one another on said infeed side, and for rotating each of said feeder-stripper rolls in the same direction as the respective one of said cutter rolls with which it is intermeshed; and (d) lower stripper roll means including at least one stripper roll located on an outfeed side of said intermeshed cutter rolls, each said lower stripper roll being intermeshed with a respective one of said cutter rolls and having drive means for rotating said lower stripper roll in the same direction as said respective cutter roll is rotated, for stripping a portion of said cut pieces of scrap material from the interstices between said cutter discs.

* * * * *